US012633701B2

(12) United States Patent
Morinaga

(10) Patent No.: US 12,633,701 B2
(45) Date of Patent: May 19, 2026

(54) TERMINAL MODULE AND CONNECTOR

(71) Applicant: SUMITOMO WIRING SYSTEMS, LTD., Mie (JP)

(72) Inventor: Yosuke Morinaga, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 368 days.

(21) Appl. No.: 18/564,420

(22) PCT Filed: Mar. 22, 2022

(86) PCT No.: PCT/JP2022/013194
§ 371 (c)(1),
(2) Date: Nov. 27, 2023

(87) PCT Pub. No.: WO2022/259694
PCT Pub. Date: Dec. 15, 2022

(65) Prior Publication Data
US 2024/0258740 A1 Aug. 1, 2024

(30) Foreign Application Priority Data
Jun. 8, 2021 (JP) ................................ 2021-095599

(51) Int. Cl.
*H01R 13/50* (2006.01)
*H01R 13/24* (2006.01)
(Continued)

(52) U.S. Cl.
CPC ......... *H01R 13/58* (2013.01); *H01R 13/2421* (2013.01); *H01R 13/50* (2013.01);
(Continued)

(58) Field of Classification Search
None
See application file for complete search history.

(56) References Cited

U.S. PATENT DOCUMENTS 10,218,104 B2 * 2/2019 Mukuno ................ H01R 13/15
2018/0309281 A1 10/2018 Ichikawa et al.
2019/0013609 A1 * 1/2019 Kimura .................. H01R 13/33

FOREIGN PATENT DOCUMENTS

JP 2005-100850 A 4/2005
JP 2018-101556 A 6/2018
JP 2020-194637 A 12/2020

OTHER PUBLICATIONS

International Search Report issued on Jun. 14, 2022 for WO 2022/259694 A1 (4 pages).

* cited by examiner

*Primary Examiner* — Tho D Ta
(74) *Attorney, Agent, or Firm* — Venjuris, P.C.

(57) ABSTRACT

A terminal module to be electrically connected to a mating connector by being fit to the mating connector relatively approaching along a first direction from one side toward another side is provided with a case including a ceiling wall and a pair of side walls extending toward the one side from the ceiling wall, a resilient member to be accommodated into the case and stretchable along the first direction, and an electrically conductive laminate formed by laminating a plurality of thin plates. The laminate includes a first terminal region supported on the pair of side walls while being biased toward the one side by the resilient member a second terminal region located away from the first terminal region toward the other side, and a flexible region located between the first and second terminal regions and to be deflected when the first terminal region moves toward the other side.

11 Claims, 9 Drawing Sheets

(51) Int. Cl.

| | |
|---|---|
| ***H01R 13/58*** | (2006.01) |
| ***H01R 13/73*** | (2006.01) |
| ***H01R 24/20*** | (2011.01) |
| *H01R 101/00* | (2006.01) |

(52) U.S. Cl.

CPC ............. *H01R 13/73* (2013.01); *H01R 24/20* (2013.01); *H01R 2101/00* (2013.01)

TERMINAL MODULE AND CONNECTOR

CROSS REFERENCE TO RELATED APPLICATIONS

This application is a national phase of PCT application No. PCT/JP2022/013194, filed on 22 Mar. 2022, which claims priority from Japanese patent application No. 2021-095599, filed on 8 Jun. 2021, all of which are incorporated herein by reference.

TECHNICAL FIELD

The present disclosure relates to a terminal module and a connector.

BACKGROUND

A technique is known which saves space by omitting a wiring harness by fitting connectors respectively provided on cases of devices in connecting the devices such as a motor and a PCU (Power Control Unit). For example, Patent Document 1 discloses a technique for fitting a mating connector serving as an insertion side to a connector serving as a reception side.

In Patent Document 1, the connector includes a coil spring and an electrical contact member provided on the tip of the coil spring. In fitting the connectors, a mating contact point included in the mating connector compresses the coil spring via the electrical contact member. In this way, the electrical contact member is pressed against the mating contact point by the coil spring and the electrical contact member and the mating contact point are electrically connected.

The electrical contact member is electrically connected to an external connecting member by a braided wire. The braided wire is provided to be deflected according to a movement of the electrical contact member. By the deflection of the braided wire, the electrical contact member can move while maintaining electrical connection to the external connecting member when the mating contact point is connected to the electrical contact member.

PRIOR ART DOCUMENT

Patent Document

Patent Document 1: JP 2018-101556 A

SUMMARY OF THE INVENTION

The present disclosure is directed to a terminal module to be electrically connected to a mating connector by being fit to the mating connector relatively approaching along a first direction from one side toward another side, the terminal module being provided with a case including a ceiling wall and a pair of side walls extending toward the one side from the ceiling wall, a resilient member to be accommodated into the case, the resilient member being stretchable along the first direction, and an electrically conductive laminate formed by laminating a plurality of thin plates, the laminate including a first terminal region supported on the pair of side walls while being biased toward the one side by the resilient member, the first terminal region being movable toward the other side by being pressed by the mating connector, a second terminal region located away from the first terminal region toward the other side, and a flexible region located between the first and second terminal regions, the flexible region being deflected when the first terminal region moves toward the other side, each of the first and second terminal regions including an integrated region where the plurality of thin plates are integrated in a thickness direction, and the flexible region including a non-integrated region where the plurality of thin plates are not integrated in the thickness direction.

DETAILED DESCRIPTION TO EXECUTE THE INVENTION

Problems to be Solved

Figure 1:
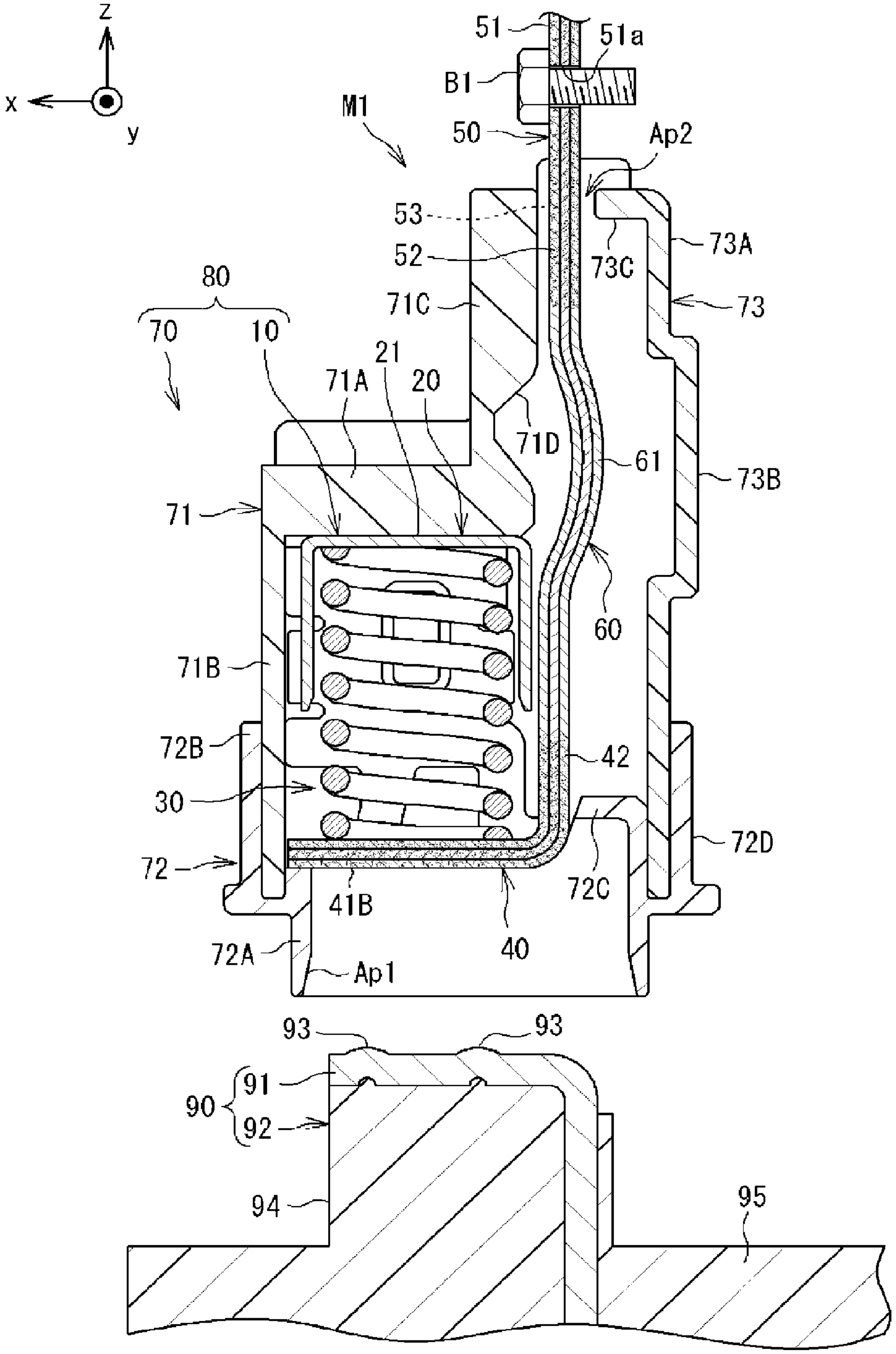
FIG. 1 is a section schematically showing a connector and a mating connector in an unfit state according to an embodiment.

As described above, in the connector accompanied by a movement of the member at the time of fitting, the braided wire is used to electrically connect a moving part (electrical contact member) and a fixed part (external connecting member). Since the braided wire is a wire obtained by braiding and bundling thin conductive wires, there is a problem that the thin conductive wires included in the braided wire are easily broken if another member (e.g. a housing) included in the connector and the braided wire rub against each other. Further, the electrical contact member, the external connecting member and the braided wire are separate members and the braided wire is joined to the electrical contact member and the external connecting member by welding. To further reduce the cost of the connector, it is necessary to further reduce the number of components.

In view of such a problem, the present disclosure aims to provide a terminal module capable of further reducing the cost of a connector while suppressing the breaking of a member. Further, the present disclosure aims to provide a connector capable of further reducing cost while suppressing the breaking of a member.

Effect of the Invention

According to the present disclosure, it is possible to further reduce the cost of a connector while suppressing the breaking of a member.

DESCRIPTION OF EMBODIMENTS OF PRESENT DISCLOSURE

As a summary, embodiments of the present disclosure include the following configurations.

(1) The terminal module of the present disclosure is a terminal module to be electrically connected to a mating connector by being fit to the mating connector relatively approaching along a first direction from one side toward another side, the terminal module being provided with a case including a ceiling wall and a pair of side walls extending toward the one side from the ceiling wall, a resilient member to be accommodated into the case, the resilient member being stretchable along the first direction, and an electrically conductive laminate formed by laminating a plurality of thin plates, the laminate including a first terminal region supported on the pair of side walls while being biased toward the one side by the resilient member, the first terminal region being movable toward the other side by being pressed by the mating connector, a second terminal region located away from the first terminal region toward the other side, and a flexible region located between the first and second terminal regions, the flexible region being deflected when the first terminal region moves toward the other side, each of the first and second terminal regions including an integrated region where the plurality of thin plates are integrated in a thickness direction, and the flexible region including a non-integrated region where the plurality of thin plates are not integrated in the thickness direction.

The first and second terminal regions can have necessary stiffness as a terminal as before by including the integrated region. The flexible region is lower in stiffness than the integrated region and can be deflected according to a movement of the first terminal region by including the non-integrated region. In this way, three members including conventional electrical contact member, external connecting member and braided wire can be realized by one member called the laminate, wherefore the cost of the connector can be reduced. Further, the flexible region is formed by the plurality of thin plates and less likely to be broken than the braided wire. Thus, the cost of the connector can be further reduced while the breaking of members is suppressed.

(2) Preferably, the plurality of thin plates are thin plates made of metal, and the integrated region includes a joined region where the plurality of thin plates are resistance-welded or crimped in the thickness direction.

Since the joined region is formed by directly resistance-welding or crimping the plurality of thin plates in the thickness direction, it is not necessary to form a separate crimping terminal or the like on end parts of the thin plates. Thus, the cost can be further reduced.

(3) Preferably, the first terminal region includes a first part facing the ceiling wall in the first direction on the one side of the resilient member, the first part being provided to be able to contact the mating connector, and a second part extending toward the other side from an end part of the first part in a second direction intersecting the first direction, and the first and second parts are the integrated region.

By forming the first and second parts as the integrated region, the loosening of the plurality of thin plates in the first and second parts can be prevented and the shapes of the first and second parts can be suitably maintained. In this way, the first and second parts are easily attached to the pair of side walls and cost in manufacturing the connector can be reduced.

(4) Preferably, the first terminal region includes an engaging portion configured to come into contact with the pair of side walls before fitting to the mating connector, and the engaging portion is the integrated region.

The engaging portion maintains the first terminal region in the unfit state at a predetermined position by coming into contact with the pair of side walls. By forming the engaging portion as the integrated region, the stiffness of the engaging portion is enhanced. Thus, the first terminal region in the unfit state can be more reliably maintained at the predetermined position.

(5) Preferably, the first terminal region includes a guided portion to be guided by guide surfaces provided on the pair of side walls so that the first terminal region moves also in a second direction intersecting the first direction when moving toward the other side, and the guided portions are the integrated region.

By this configuration, the stiffness of the guided portion is enhanced and the guided portion can be more stably guided by the guide surfaces.

(6) Preferably, the flexible region includes a bent portion convex toward a predetermined side in a second direction intersecting the first direction before fitting to the mating connector, and the bent portion is deflected toward the predetermined side when the first terminal region moves toward the other side.

By providing the bent portion, a deflection direction of the flexible region can be restricted to a direction toward the predetermined side.

(7) A connector of the present disclosure is provided with the terminal module of any one of (1) to (6) described above, and a housing for accommodating the terminal module.

(8) Preferably, the housing includes an accommodating portion for accommodating the flexible region at the time of fitting to the mating connector.

By this configuration, the contact of the flexible region and the housing can be suppressed and the wear of the flexible region can be suppressed. In this way, the breaking of the flexible region can be more suppressed.

(9) Preferably, the flexible region includes a bent portion convex toward a predetermined side in a second direction intersecting the first direction before fitting to the mating connector, the bent portion is deflected toward the predetermined side when the first terminal region moves toward the other side, and the accommodating portion is located on the predetermined side of the flexible region and accommodates the bent portion at the time of fitting to the mating connector.

By providing the bent portion, a deflection direction of the flexible region can be restricted to the direction toward the predetermined side. By providing the accommodating portion on the predetermined side and accommodating the bent portion into the accommodating portion, the contact of the flexible region and the housing can be more reliably suppressed.

(10) Preferably, the housing includes an edge portion forming an opening for opening an internal space of the housing to the other side, the laminate is inserted into the opening in the first direction, the second terminal region includes a recessed portion recessed in a third direction intersecting both the thickness direction and the first direction and is fixed to the edge portion with the edge portion accommodated in the recessed portion, and the recessed portion is the integrated region.

By forming the recessed portion as the integrated region, the stiffness of the recessed portion is enhanced. Thus, the second terminal region can be more stably fixed to the housing.

(11) Preferably, the second terminal region includes a bolt fastening portion forming a bolt hole on a side closer to the other side than the recessed portion, a bolt for fastening a device and the laminate being inserted into the bolt hole, and a region of the second terminal region from the recessed portion to the bolt fastening portion is the integrated region.

By this configuration, a region of the second terminal region projecting further toward the other side than the opening is formed as the integrated region and is high in stiffness. Thus, an operation of fastening the device and the laminate by the bolt is easily performed.

DETAILS OF EMBODIMENT OF PRESENT DISCLOSURE

Hereinafter, an embodiment of the present disclosure is described in detail with reference to the drawings.

<<Overall Configuration of Connector>>

Figure 2:
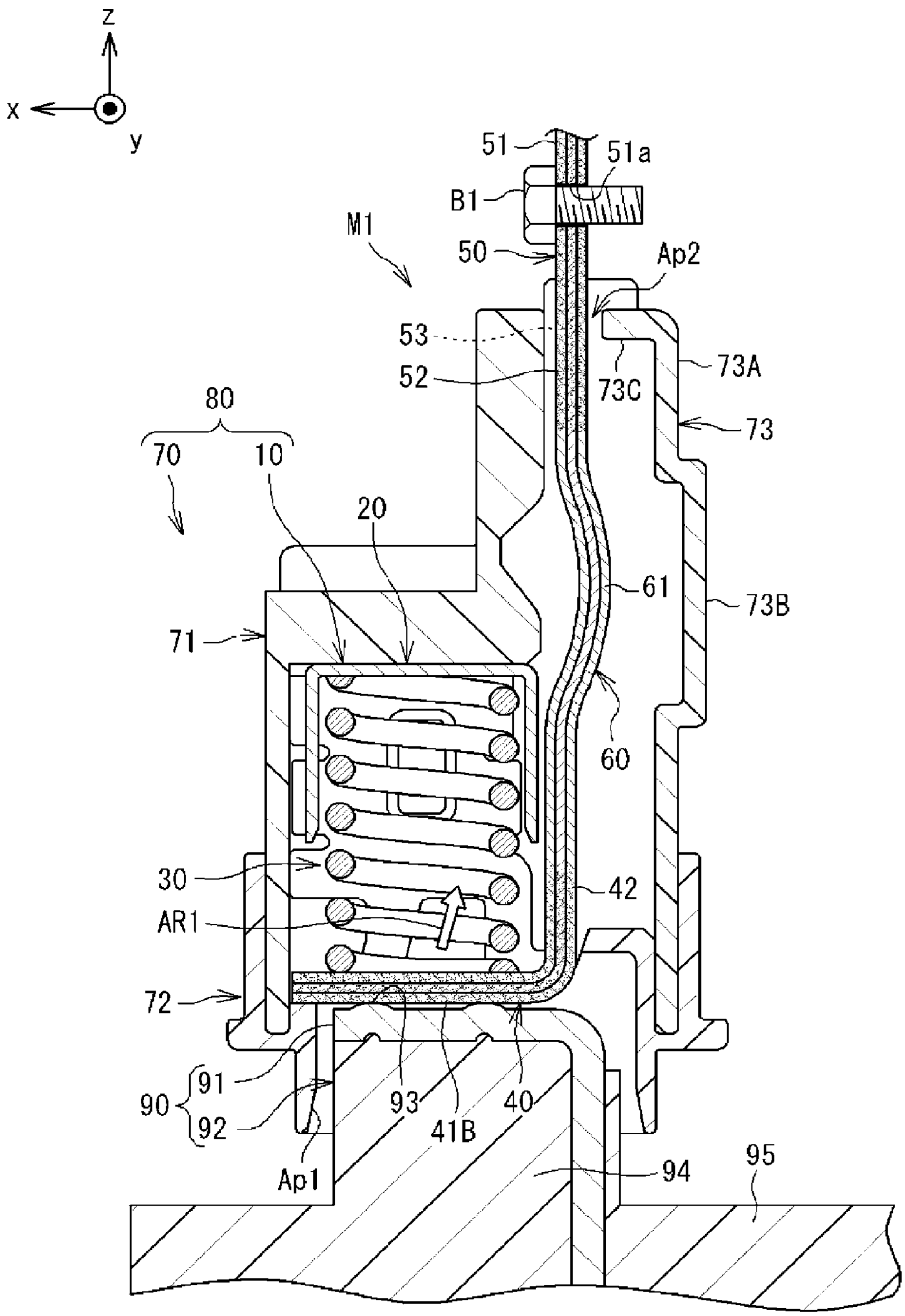
FIG. 2 is a section schematically showing the connector and the mating connector being fit according to the embodiment.
Figure 3:
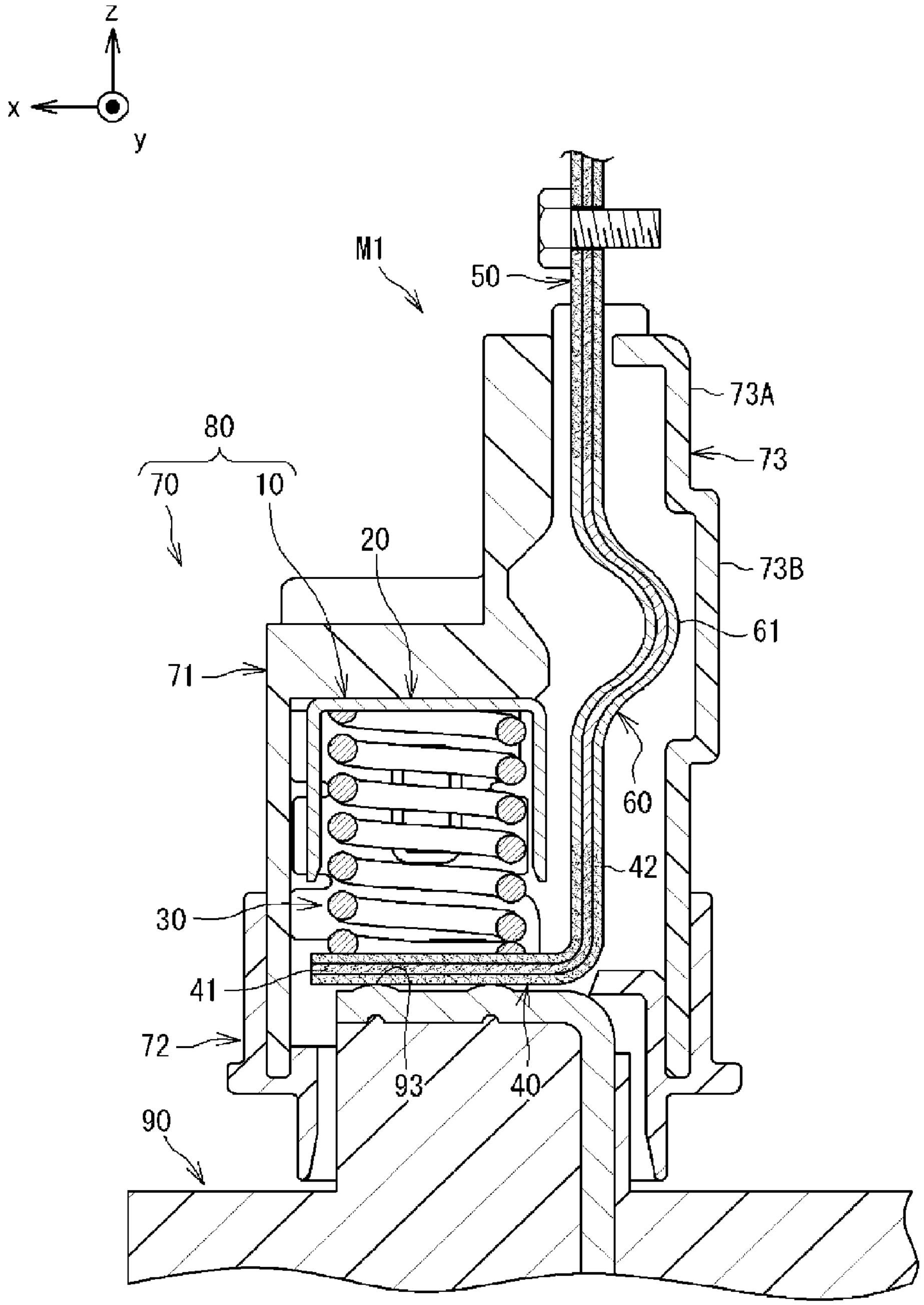
FIG. 3 is a section schematically showing the connector and the mating connector in a fit state according to the embodiment.

FIG. 1 is a section schematically showing a connector 80 and a mating connector 90 in an unfit state according to the embodiment. In the connector 80, a state before fitting to the mating connector 90 is called an "unfit state". FIG. 2 is a section schematically showing the connector 80 and the mating connector 90 being fit. FIG. 3 is a section schematically showing the connector 80 and the mating connector 90 after fitting. In the connector 80, a state after fitting to the mating connector 90 is called a "fit state".

In the following description, an attachment/detachment direction of the mating connector 90 to/from the connector 80 is referred to as a "vertical direction (first direction of the present disclosure)" and shown as a z direction in figures. A side toward which the mating connector 90 is attached to the connector 80 is an "upper side (positive side in the z direction, other side of the present disclosure)". Further, in the connector 80, a direction which is orthogonal to the vertical direction and in which a resilient member 30 is located with respect to a flexible region 60 to be described later is referred to as a "front-rear direction (second direction of the present disclosure)" and shown as an x direction in figures. A side on which the resilient member 30 is located with respect to the flexible region 60 is a "front side (positive side in the x direction)". Further, a direction orthogonal to the vertical direction and front-rear direction is referred to as a "lateral direction (third direction of the present disclosure)" and shown as a y direction in figures. A left side when facing forward is a "left side (positive side in the y direction) ". Note that the above directions are relative directions for describing the configuration and the like of the connector 80 and do not mean directions when the connector 80 is actually attached to a device.

The connector 80 and the mating connector 90 are respectively provided on devices mounted in a vehicle. For example, the connector 80 is provided on a PCU (an example of the device) including an inverter circuit, and the mating connector 90 is provided on a motor (an example of the device). By inserting the mating connector 90 into the connector 80 as shown in FIG. 3 by way of a state shown in FIGS. 1 to 2, the connector 80 and the mating connector 90 are fit and the PCU and the motor are electrically connected. The fitting of the connector 80 and the mating connector 90 is described later.

The connector 80 is provided with a terminal module 10 and a housing 70. The terminal module 10 is described appropriately with reference to FIGS. 4 to 8 and the housing 70 is described with reference to FIG. 1 below.

<<Configuration of Terminal Module>>

Figure 4:
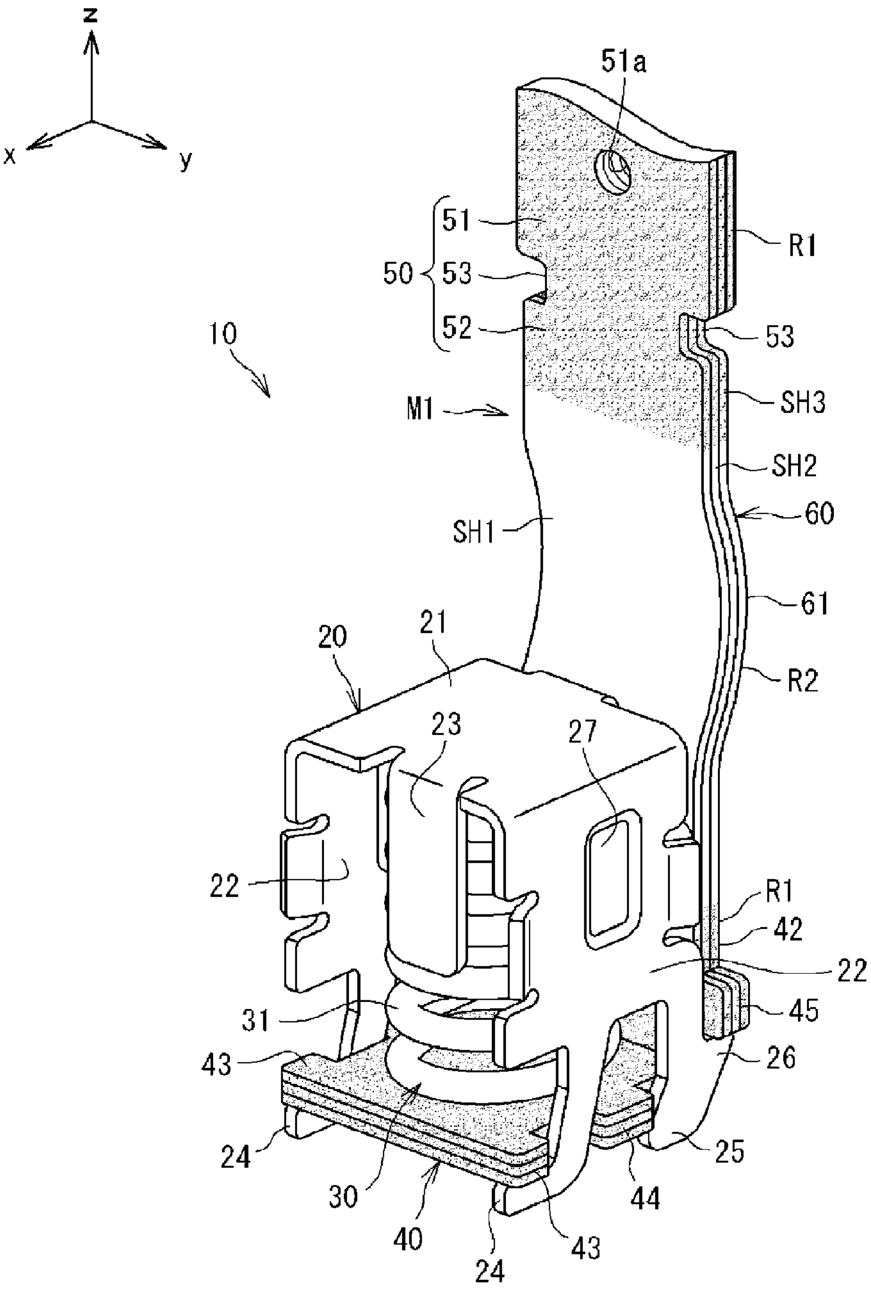
FIG. 4 is a perspective view of a terminal module according to the embodiment when viewed obliquely from a left upper side.
Figure 5:
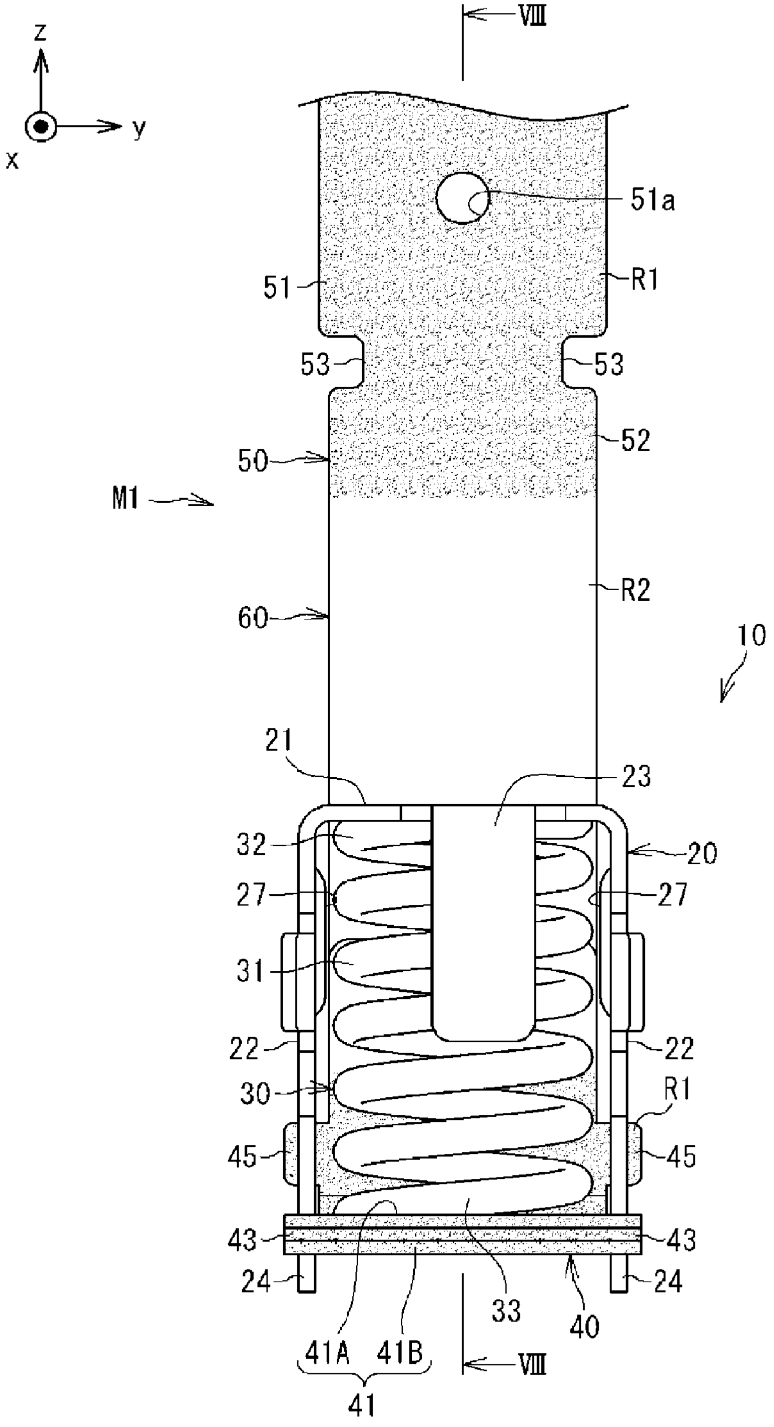
FIG. 5 is a front view of the terminal module of FIG. 4 when viewed from front.
Figure 6:
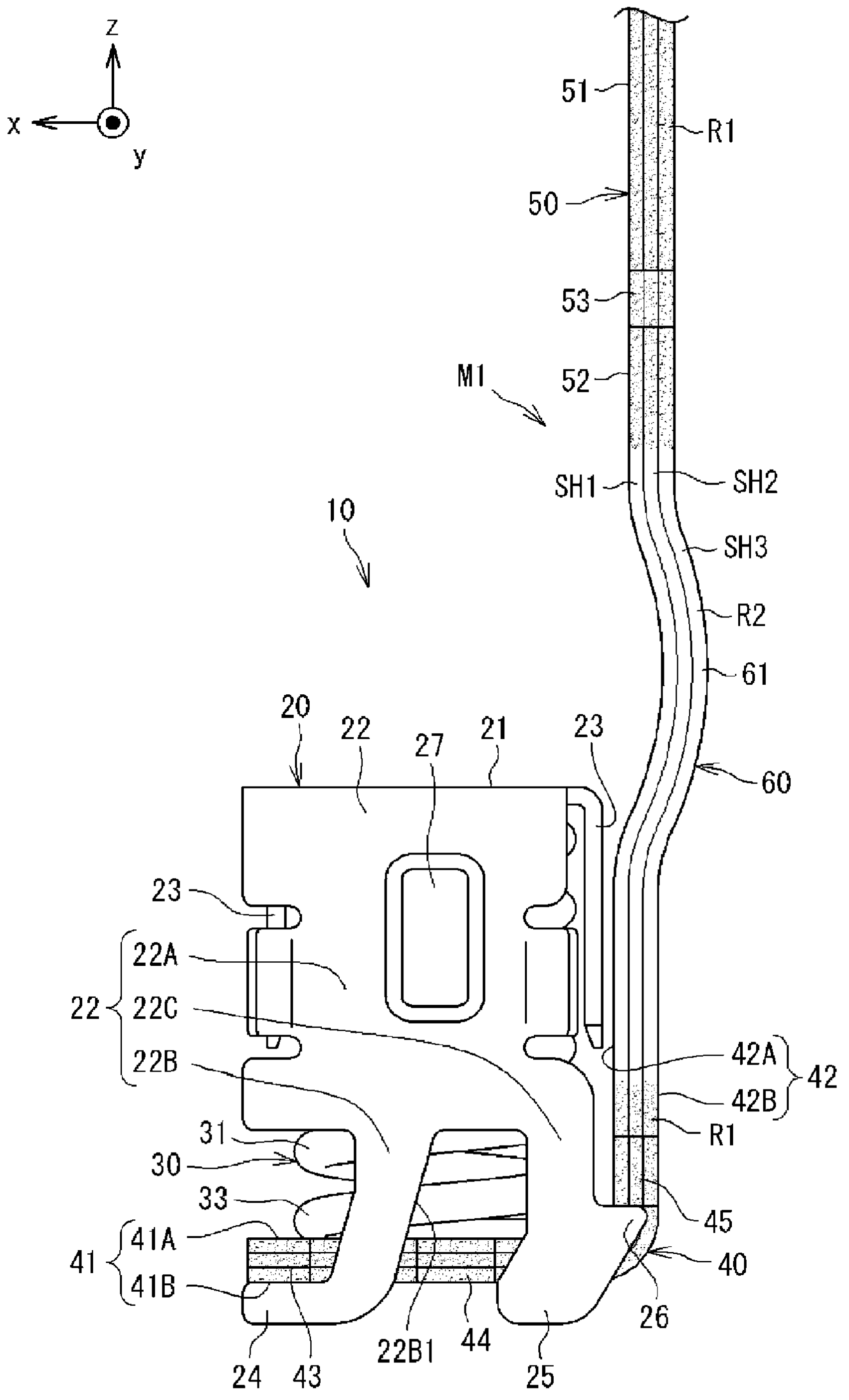
FIG. 6 is a side view of the terminal module of FIG. 4 when viewed from left.
Figure 7:
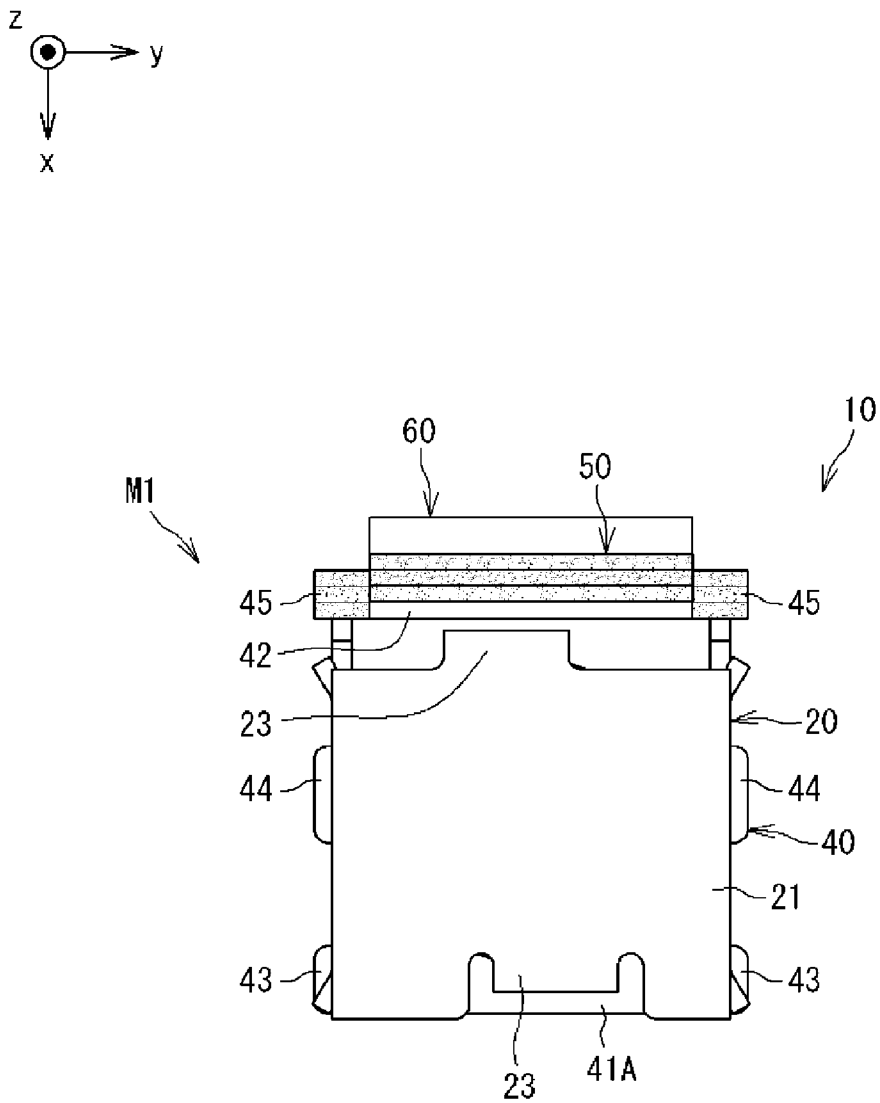
FIG. 7 is a plan view of the terminal module of FIG. 4 when viewed from above.
Figure 8:
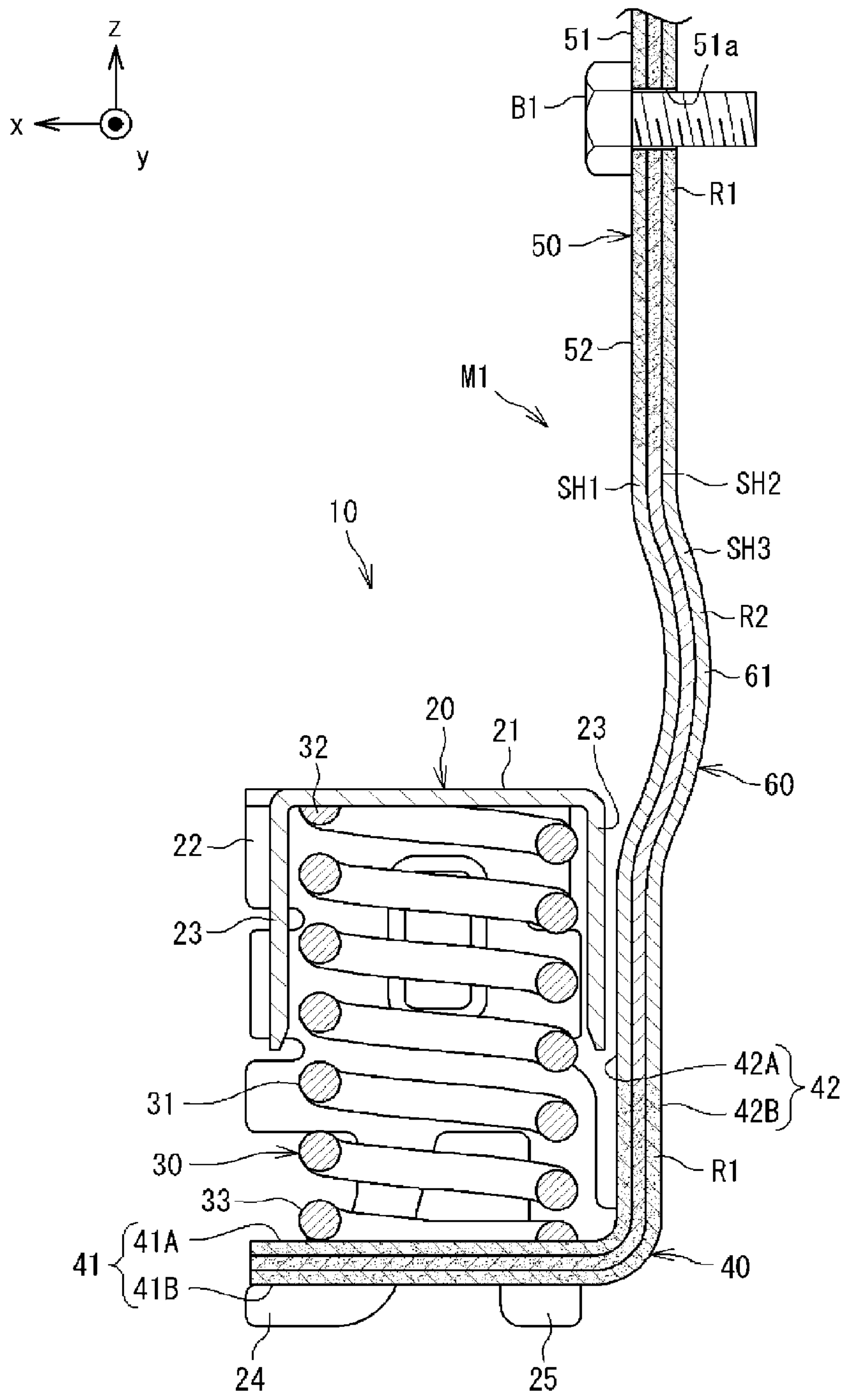
FIG. 8 is a section of the terminal module cut along a cutting line indicated by arrows VIII of FIG. 5.

FIG. 4 is a perspective view of the terminal module 10 according to this embodiment when viewed obliquely from a left upper side. FIG. 5 is a front view of the terminal module 10 when viewed from front. FIG. 6 is a side view of the terminal module 10 when viewed from left. FIG. 7 is a plan view of the terminal module 10 when viewed from above. FIG. 8 is a section of the terminal module 10 cut along a cutting line indicated by arrows VIII of FIG. 5. Here, FIGS. 1, 2 and 3 show the connector 80 and the mating connector 90 in the same cross-section as in FIG. 8.

The terminal module 10 is a module for electrically connecting a mating terminal 91 (FIG. 1) included in the mating connector 90 and an electrical circuit (not shown) included in the device. The terminal module 10 is provided with a case 20, a resilient member 30 and a laminate M1. Each component of the terminal module 10 described below is a component in the connector 80 in the unfit state (i.e. in a state of FIG. 1).

The case 20 includes a ceiling wall 21, a pair of left and right side walls 22, 22 and a pair of front and rear side walls 23, 23. The case 20 is made of metal (e.g. stainless steel), and the ceiling wall 21, the side walls 22, 22 and the side walls 23, 23 are integrally formed by press-working a plate material. The ceiling wall 21 is a flat plate-like region provided along the front-rear direction and lateral direction. Widths in the front-rear direction and lateral direction of the ceiling wall 21 are larger than those of the resilient member 30. As shown in FIG. 7, the entire resilient member 30 is covered by the ceiling wall 21 when viewed from above.

The pair of side walls 22, 22 are a pair of walls extending downward from edges in the lateral direction of the ceiling wall 21 and parallel to each other. Since the pair of side walls 22, 22 are respectively mirror-symmetrically shaped, the side wall 22 on a left side is described as a representative below. As shown in FIG. 6, the side wall 22 includes a base portion 22A, a first leg portion 22B and a second leg portion 22C.

The base portion 22A is a region connected to the ceiling wall 21. The base portion 22A has the same width as the ceiling wall 21 in the front-rear direction. The base portion 22A includes a protrusion 27 projecting rightward (i.e. inward in the lateral direction). The inner surface in the lateral direction of the protrusion 27 is facing a lateral side part of the resilient member 30 across a tiny gap as shown in FIG. 5. The protrusion 27 has a function of receiving the resilient member 30 bent in the lateral direction when the resilient member 30 is compressed or expanded.

The first leg portion 22B is a region inclined forward while extending downward from the base portion 22A in a central part in the front-rear direction of the base portion 22A. In the first leg portion 22B, a vertical width is longer than an inclination width in the front-rear direction. The first leg portion 22B has a width smaller than the base portion 22A (specifically, about ¼ of the width of the base portion 22A) in the front-rear direction.

The rear surface of the first leg portion 22B functions as a guide surface 22B1 for guiding a guided portion 44 to be described later at the time of fitting to the mating connector 90. Since the guide surface 22B1 extends downward while being inclined in the front-rear direction, the guided portion 44 is guided in the vertical direction and also in the front-rear direction along the guide surface 22B1. The first leg portion 22B includes a first receiving portion 24 extending forward on a lower end part. The upper surface of the first receiving portion 24 is a surface extending along the front-rear direction and can receive a first engaging portion 43 to be described later.

The second leg portion 22C is a region extending downward from the base portion 22 below and on a rear side of the base portion 22A. The second leg portion 22C is located behind the first leg portion 22B and the first and second leg portions 22B, 22C are separated in the front-rear direction. The guided portion 44 to be described later is inserted into between the first and second leg portions 22B, 22C. The second leg portion 22C has a width smaller than the base portion 22A (specifically, about ¼ of the width of the base portion 22A) in the front-rear direction. The second leg portion 22C includes a second receiving portion 26 extending rearward above a lower end portion 25. The upper surface of the second receiving portion 26 is a surface extending along the front-rear direction and can receive a second engaging portion 45 to be described later.

The pair of side walls 23, 23 are a pair of walls extending downward from edges in the front-rear direction of the ceiling wall 21 and parallel to each other. The pair of side walls 23, 23 have a width smaller than the ceiling wall 21 (specifically, about ⅓ of the width of the ceiling wall 21) in the lateral direction. Further, the pair of side walls 23, 23 have a width smaller than the ceiling wall 21 (specifically, about ½ of the width of the side wall 22) in the vertical direction. The inner surfaces in the front-rear direction of the pair of side walls 23, 23 are facing sides parts in the front-rear direction of the resilient member 30 across tiny gaps as shown in FIG. 8. The pair of side walls 23, 23 have a function of receiving the resilient member 30 bent in the front-rear direction when the resilient member 30 is compressed or expanded.

The resilient member 30 is a coil spring formed by winding a wire material made of metal (e.g. stainless steel) into a coil. Note that the resilient member 30 may be a member other than the coil spring if the member can be stretched in the vertical direction and inclined also in the front-rear direction. For example, the resilient member 30 may be another spring member (e.g. a leaf spring) or a rubber member.

The resilient member 30 is accommodated in the case 20. That is, the resilient member 30 is accommodated in a space surrounded by the ceiling wall 21, the pair of side walls 22, 22 and the pair of side walls 23, 23 and open downward. The resilient member 30 is sandwiched while being compressed in the vertical direction by the ceiling wall 21 and a first part 41 to be described later. In this state, the resilient member 30 is further compressible in the vertical direction. That is, the resilient member 30 is compressed in a range shorter than a natural length and longer than a close contact length by the ceiling wall 21 and the first part 41.

As shown in FIG. 8, the resilient member 30 includes a body portion 31, an upper end portion 32 and a lower end portion 33. The upper end portion 32 is a region of about one turn from the upper end of the resilient member 30 and in contact with the ceiling wall 21. The lower end portion 33 is a region of about one turn from the lower end of the resilient member 30 and in contact with the first part 41. The body portion 31 is a region located between the upper end portion 32 and the lower end portion 33.

The laminate M1 is an electrically conductive member formed by laminating a plurality of thin plates SH1, SH2 and SH3 and also called a laminated busbar. Although the laminate M1 formed by laminating three thin plates SH1, SH2 and SH3 is described for the sake of convenience in this embodiment, the laminate M1 actually includes more thin plates (e.g. five to fifteen thin plates). Each of the thin plates SH1, SH2 and SH3 is made of metal (e.g. copper alloy) and has such a thickness (e.g. 0.1 to 0.9 mm) as to be deflectable by a human finger.

The thin plate SH1 is located on an uppermost side in the first part 41 to be described later, and located on a foremost side in a second part 42, a second terminal region 50 and the flexible region 60 to be described later. The thin plate SH3 is located on a lowermost side in the first part 41 to be described later and located on a rearmost side in the second part 42, the second terminal region 50 and the flexible region 60 to be described later. The thin plate SH2 is located between the thin plates SH1 and SH3.

The laminate M1 has integrated regions R1 where the plurality of thin plates SH1, SH2 and SH3 are integrated in a thickness direction, and a non-integrated region R2 where the plurality of thin plates SH1, SH2 and SH3 are not integrated in the thickness direction. The integrated regions R1 are shown by shading in FIGS. 1 to 8.

The integrated region R1 is integrated in the thickness direction, for example, by resistance welding or crimping. The integrated region R1 has higher stiffness than each of the thin plates SH1, SH2 and SH3 by integrating the plurality of thin plates SH1, SH2 and SH3 in the thickness direction, and is stiff not to be deflected only by a human finger. Since the plurality of thin plates SH1, SH2 and SH3 are not integrated in the thickness direction in the non-integrated region R2, the non-integrated region R2 has such stiffness as to be deflectable by a human finger. That is, the integrated region R1 is higher in stiffness than the non-integrated region R2.

The laminate M1 includes a first terminal region 40, the second terminal region 50 and the flexible region 60. Each of the first and second terminal regions 40, 50 includes the integrated region R1. The flexible region 60 includes the non-integrated region R2. Thus, the stiffness of the flexible region 60 is lower than that of the first terminal region 40 and that of the second terminal region 50.

In this embodiment, an example is described where each of the first and second terminal regions 40, 50 is constituted only by the integrated region R1 and the flexible region 60 is constituted only by the non-integrated region R2. However, the first or second terminal region 40, 50 may include the non-integrated region R2 or the flexible region 60 may include the integrated region R1.

The first terminal region 40 is a region capable of physically contacting the mating terminal 91, and attached to the pair of side walls 22, 22. The first terminal region 40 includes the first part 41 and the second part 42. The first and second parts 41, 42 are integrally formed, for example, by press-working an end part of the laminate M1. The first part 41 is provided in parallel to the ceiling wall 21 (e.g. along the front-rear direction and lateral direction) while being separated downward from the ceiling wall 21. The second part 42 is a region extending upward from the rear edge of the first part 41. Thus, the first terminal region 40 is L-shaped in a side view as shown in FIG. 6 (in a side cross-sectional view as shown in FIG. 8).

An upper surface 41A of the first part 41 functions as a receiving surface for receiving the lower end portion 33 of the resilient member 30. A lower surface 41B of the first part 41 functions as a contact surface capable of contacting mating contact points 93 included in the mating terminal 91.

As shown in FIGS. 4 and 7, the first part 41 includes a pair of left and right first engaging portions 43, 43 and a pair of left and right guided portions 44, 44. The first engaging portion 43 is a region projecting outward in the lateral direction on the front edge of the first part 41, and comes into contact with the first receiving portion 24 of the first leg portion 22B in the vertical direction. The guided portion 44 is a region projecting outward in the lateral direction in a central part in the front-rear direction of the first part 41, and inserted into a gap between the first and second leg portions 22B, 22C.

As shown in FIGS. 6 and 8, a front surface 42A of the second part 42 is a surface facing toward the resilient member 30, and is facing the side wall 23 on a rear side across a tiny gap in the front-rear direction. A rear surface 42B of the second part 42 is a surface facing toward a side opposite to the resilient member 30. As shown in FIGS. 4 and 5, the second part 42 includes a pair of left and right second engaging portions 45, 45. The second engaging portion 45 is a region projecting outward in the lateral direction somewhat below a central part in the vertical direction of the second part 42 and comes into contact with the second receiving portion 26 of the second leg portion 22C in the vertical direction.

The first terminal region 40 is biased downward by the resilient member 30. A downward movement of the first terminal region 40 is restricted by the contact of the first engaging portions 43 with the first receiving portions 24 and the contact of the second engaging portions 45 with the second receiving portions 26. That is, in the unfit state, the first terminal region 40 is supported by the pair of side walls 22, 22 while being sandwiched by the resilient member 30 and the pair of side walls 22, 22 (specifically, a pair of the first receiving portions 24, 24 and a pair of the second receiving portions 26, 26).

The second terminal region 50 is a flat plate-like region electrically connected to an electrical circuit (not shown) included in the PCU, and mounted in the housing 70. As shown in FIG. 6, the second terminal region 50 is located above and apart from the first terminal region 40 and extends in the vertical direction. The second terminal region 50 includes an upper part 51 ("bolt fastening portion" of the present disclosure), a lower part 52 and recessed portions 53. The upper part 51, the lower part 52 and the recessed portions 53 are integrally formed, for example, by press-working an end part of the laminate M1.

As shown in FIG. 1, the upper part 51 is a region provided outside the housing 70 and to be connected to the electrical circuit (not shown) of the device. The upper part 51 is formed with a bolt hole 51*a* (FIG. 4) penetrating in the front-rear direction. A bolt B1 (FIG. 1) for fastening the device and the laminate M1 is inserted through the bolt hole 51*a*.

The lower part 52 is a region extending downward from the upper part 51 and provided inside the housing 70. As shown in FIG. 6, the lower part 52 is located above the ceiling wall 21. The lower part 52 is facing the housing 70 (FIG. 1) across a tiny gap in the front-rear direction. The recessed portions 53 are regions recessed inward in the lateral direction in a boundary region between the upper part 51 and the lower part 52, and provided in an opening Ap2 to be described later formed in the housing 70.

The flexible region 60 is a region located between the first and second terminal regions 40, 50, and deflected when the first terminal region 40 moves upward. The flexible region 60 includes a bent portion 61 convex rearward in the unfit state. The bent portion 61 is deflected rearward when the first terminal region 40 moves upward. That is, the bent portion 61 is a part reformed to be deflected rearward when the first terminal region 40 moves upward.

Figure 9A:
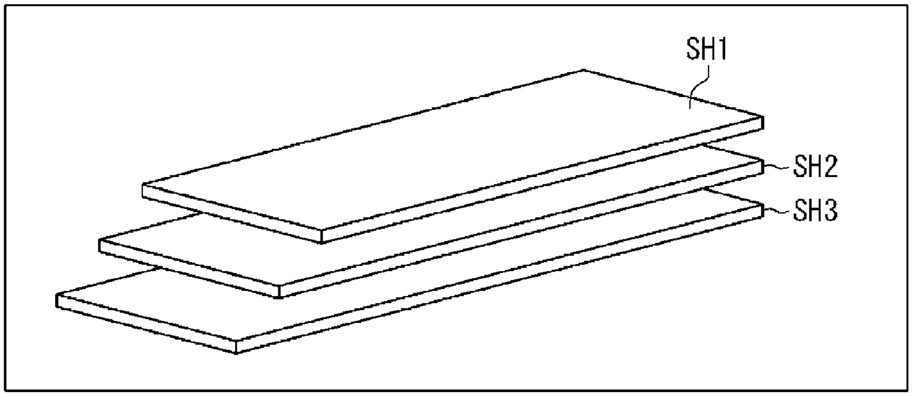
FIGS. 9A to 9C are diagrams showing an example of a method for manufacturing a laminate.
Figure 9B:
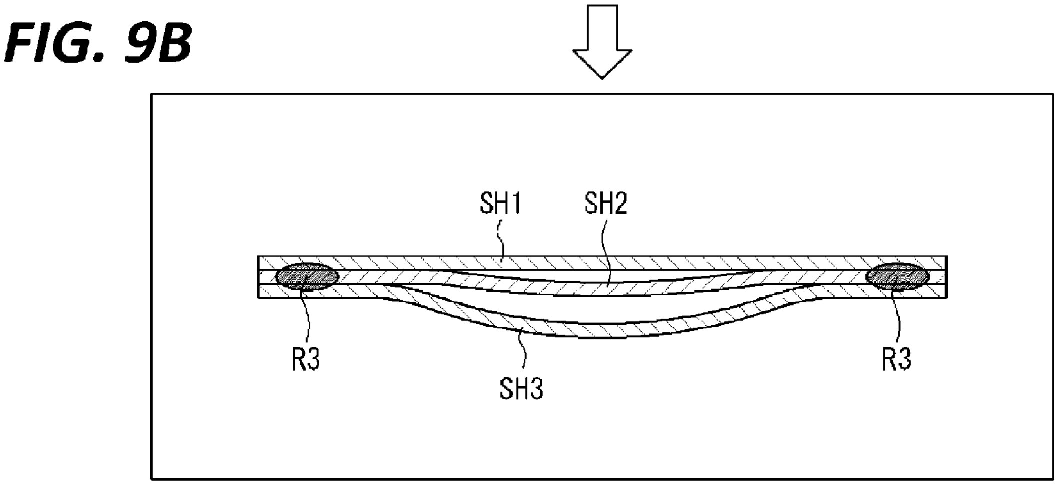
Figure 9C:
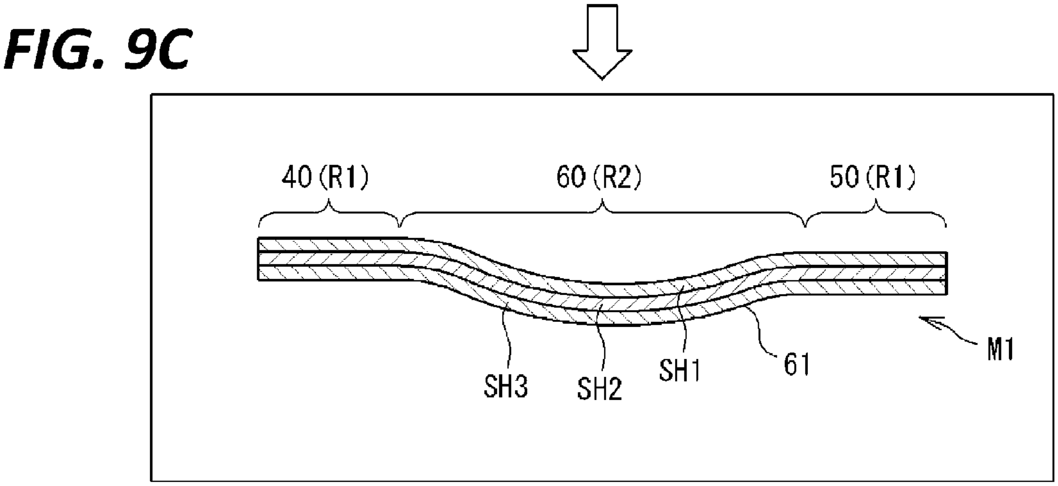

FIGS. 9A to 9C are diagrams showing an example of a method for forming the bent portion 61 in the flexible region 60. This method is a part of a method for manufacturing the terminal module 10. First, the plurality of thin plates SH1, SH2 and SH3 are overlapped in the thickness direction as shown in FIG. 9A. Here, the thin plate SH1 is shorter than the thin plate SH2, and the thin plate SH2 is shorter than the thin plate SH3.

Next, as shown in FIG. 9B, with both end parts of the plurality of thin plates SH1, SH2 and SH3 respectively aligned, the both end parts are resistance-welded or crimped to form joined regions R3. Since the both end parts of the thin plates SH2, SH3 are aligned with those of the shorter thin plate SH1, the thin plates SH2, SH3 are deflected convexly toward a predetermined side in central parts.

Finally, as shown in FIG. 9C, the both end parts are brought closer to each other. In this way, a central part of the thin plate SH1 is also deflected convexly toward the predetermined side, in addition to the thin plates SH2, SH3. Note that, to more reliably deflect the thin plate SH1 toward the predetermined side, the thin plate SH1 may be pressed from a side opposite to the predetermined side by a jig in bringing the both end parts closer to each other. Such a deflected region becomes the bent portion 61. Further, regions including the joined regions R3 become the integrated regions R1. The integrated region R1 on one side (left side in FIGS. 9A to 9C) becomes the first terminal region 40, and that on the other side becomes the second terminal region 50. Further, the non-integrated central part becomes the non-integrated region R2 (flexible region 60).

<<Configuration of Housing>>

Reference is made to FIG. 1. The housing 70 is a member made of resin for accommodating the terminal module 10. The housing 70 includes an upper divided body 71, a lower divided body 72 and a cover 73. The upper and lower divided bodies 71, 72 are members divided vertically. By combining the upper and lower divided bodies 71, 72 and further combining the cover 73, the housing 70 is configured. The upper divided body 71 is a casing open downward and includes an upper wall 71A, a front wall 71B and a rear wall 71C. Each wall 71A to 71C of the upper divided body 71 is integrally formed, for example, by injection molding.

The upper wall 71A is a wall in contact with the ceiling wall 21 in the vertical direction, and provided along the front-rear direction and lateral direction. The front wall 71B is a wall in contact with the pair of side walls 22, 22 in the front-rear direction, and extends downward from the front edge of the upper wall 71A. The lower end of the front wall 71B is located below the lower surface 41B of the first terminal region 40. The rear wall 71C is a wall extending upward from the rear edge of the upper wall 71A.

The rear wall 71C is facing the lower part 52 of the second terminal region 50 in the front-rear direction. The upper end of the rear wall 71C is at the same position as the recessed portions 53 of the second terminal region 50 in the vertical direction. A part of the rear wall 71C facing the flexible region 60 in the front-rear direction is formed with an accommodating portion 71D recessed forward. The accommodating portion 71D accommodates the flexible region 60 deflected forward in the fit state.

The lower divided body 72 is a casing formed with an opening Ap1 open in the vertical direction. The lower divided body 72 includes a tube portion 72A, a front wall 72B, a partition wall 72C and a rear wall 72D. Each part 71A to 72D of the lower divided body 72 is integrally formed, for example, by injection molding.

The tube portion 72A is a region having a rectangular tube shape and provided on a lower side of the lower divided body 72. The opening Ap1 for allowing the entrance of the mating connector 90 from below is formed by the tube portion 72A. Inside dimensions of the tube portion 72A are larger than outside dimensions of the mating terminal 91 and a fitting portion 94 to be described later included in the mating connector 90, and the mating terminal 91 and the fitting portion 94 can enter the tube portion 72A.

The upper end of the tube portion 72A is in contact with the lower surface 41B of the first terminal region 40. Thus, the terminal module 10 is held in the housing 70 while being vertically sandwiched by the upper wall 71A and the upper end of the tube portion 72A. The lower surface 41B of the first terminal region 40 is exposed below the connector 80 via the opening Ap1. A width in the front-rear direction of the tube portion 72A is larger than that of the first terminal region 40, and the rear end of the tube portion 72A is located rearward of the second part 42.

The front wall 72B is a wall extending upward after projecting forward from an intermediate part in the vertical direction of the tube portion 72A. The front wall 71B of the upper divided body 71 is in contact with a rear side of the front wall 72B, and the lower end of the front wall 71B is inserted into a gap formed by the front wall 72B and the tube portion 72A.

The partition wall 72C is a wall extending forward from the upper end of a rear side of the tube portion 72A. The partition wall 72C has a function of partitioning a space into which the mating connector 90 enters (space where the opening Ap1 is located) and a space where the flexible region 60 is located at the time of fitting the mating connector 90.

The rear wall 72D is a wall extending upward after projecting rearward from an intermediate part in the vertical direction of the tube portion 72A. A body portion 73A to be described later comes into contact with a front side of the rear wall 72D, and the lower end of the body portion 73A is inserted into a gap formed between the rear wall 72D and the tube portion 72A.

The cover 73 is a member to be located behind the first terminal region 40, the second terminal region 50 and the flexible region 60. The cover 73 includes the body portion 73A, an accommodating portion 73B and an edge portion 73C. Each portion 73A to 73C of the cover 73 is integrally formed, for example, by injection molding.

The accommodating portion 73B is a region bulging rearward from the body portion 73A. The accommodating portion 73B accommodates the flexible region 60 deflected rearward in the fit state.

The edge portion 73C is a region extending in the front-rear direction from the upper end of the body portion 73A. The opening Ap2 open upward is formed between the edge portion 73C and the rear wall 71C. The opening Ap2 is an opening for opening an internal space of the housing 70 upward, and the laminate M1 is inserted through the opening Ap2 in the vertical direction. More specifically, the second terminal region 50 is inserted into the housing 70 via the opening Ap2.

The recessed portions 53 are located in the opening Ap2, and the second terminal region 50 is fixed in the housing 70 by the upper and lower parts 51, 52 sandwiching the edge portion 73C located lateral to the opening Ap2. That is, the second terminal region 50 is fixed to the edge portion 73C with the edge portion 73C accommodated in the recessed portions 53.

<<Configuration of Mating Connector>>

The mating connector 90 includes the mating terminal 91 and a mating housing 92. The mating terminal 91 is provided in the mating housing 92 by insert molding. The mating terminal 91 is an electrically conductive member (e.g. made of copper alloy) and has an L shape including a region extending in the vertical direction and a region extending forward from the former region. The mating terminal 91 includes the mating contact points 93 to be brought into contact with the lower surface 41B of the first terminal region 40. The mating contact point 93 is provided in the form of a bead on the upper surface of the mating terminal 91 by plastically deforming a part of the mating terminal 91.

The mating housing 92 is a member made of resin. The mating housing 92 includes the fitting portion 94 insertable into the opening Ap1 and a flange portion 95 extending in the front-rear direction and lateral direction. The fitting portion 94 has a shape convex upward and holds the mating terminal 91 on the upper surface thereof. The flange portion 95 is larger than the opening Ap1 in the front-rear direction and lateral direction, and suppresses the entrance of the mating connector 90 into the connector 80 beyond a specified position by coming into contact with the lower end of the tube portion 72A included in the housing 70 in the fit state shown in FIG. 3.

<<Fitting of Connector and Mating Connector>>

With reference to FIGS. 1 to 3, a state of fitting the mating connector 90 to the connector 80 is described. As shown in FIGS. 1 to 2, if the mating connector 90 moves upward and approaches the connector 80, the mating terminal 91 and the fitting portion 94 of the mating connector 90 enter the inside of the housing 70 through the opening Ap1. Then, the mating contact points 93 of the mating terminal 91 contact the lower surface 41B of the first terminal region 40. Note that, when the mating connector 90 is fit to the connector 80, the connector 80 and the mating connector 90 only have to be relatively brought closer in the vertical direction and the connector 80 may move downward and approach the mating connector 90.

If the mating connector 90 moves further upward after the mating contact points 93 contact the lower surface 41B, the first terminal region 40 is pressed by the mating contact points 93, thereby moving upward while compressing the resilient member 30. At this time, the guided portions 44 (FIG. 6) of the first terminal region 40 slide in contact with the guide surfaces 22B1 of the first leg portions 22B, whereby the first terminal region 40 moves upward as shown by an arrow AR1 (FIG. 2) and also moves rearward by the inclination of the guide surfaces 22B1 in the front-rear direction. Since the width in the vertical direction is longer than the inclination width in the front-rear direction in the guide surfaces 22B1, an upward movement amount of the first terminal region 40 at the time of fitting is more than a rear movement amount.

As shown in FIG. 3, if the mating connector 90 moves further upward, the mating connector 90 is fit to the connector 80. In this state, the first part 41 of the first terminal region 40 is sandwiched in the vertical direction by the resilient member 30 and the mating contact points 93 while receiving a downward biasing force from the resilient member 30 and an upward pressing force from the mating contact points 93. By pressing the first part 41 against the mating contact points 93 by the resilient member 30 in this way, the first terminal region 40 can be more reliably electrically connected to the mating contact points 93.

The first and second terminal regions 40, 50 are constituted by the integrated regions R1 and high in stiffness to a certain extent. Thus, also when the mating connector 90 is fit, the first and second terminal regions 40, 50 are hardly deflected. On the other hand, the flexible region 60 is constituted by the non-integrated region R2 and lower in stiffness than the first and second terminal regions 40, 50. Thus, the flexible region 60 is deflected in the front-rear direction when the mating connector 90 is fit. In the case of this embodiment, the flexible region 60 is deflected rearward and accommodated into the accommodating portion 73B.

Functions and Effects of Present Disclosure

The terminal module 10 of this embodiment is electrically connected to the mating connector 90 by being fit to the mating connector 90 relatively approaching along the vertical direction, and provided with the case 20 including the ceiling wall 21 and the pair of side walls 22, 22 extending downward from the ceiling wall 21, the resilient member 30 to be accommodated into the case 20 and stretchable along the vertical direction, and the electrically conductive laminate M1 formed by laminating the plurality of thin plates SH1, SH2 and SH3.

The laminate M1 is supported by the pair of side walls 22, 22 and pressed by the mating connector 90 while being biased downward by the resilient member 30, thereby including the first terminal region 40 movable upward, the second terminal region 50 located above and away from the first terminal region 40 and the flexible region 60 located between the first and second terminal regions 40, 50 and to be deflected when the first terminal region 40 moves upward.

Each of the first and second terminal regions 40, 50 includes the integrated region R1 where the plurality of thin plates SH1, SH2 and SH3 are integrated in the thickness direction, and the flexible region 60 includes the non-integrated region R2 where the plurality of thin plates SH1, SH2 and SH3 are not integrated in the thickness direction.

Conventionally, in a connector accompanied by a movement of a member at the time of fitting, three separate members including a part (electrical contact member) configured to move by being pressed by a mating connector, a part (external connecting member) to be fixed to a device side and a braided wire for electrically connecting the electrical contact member and the external connecting member are joined.

In contrast, in this embodiment, the first terminal region 40 configured to move by being pressed by the mating connector 90, the second terminal region 50 to be fixed to the device side and the flexible region 60 to be deflected between the first and second terminal regions 40, 50 are integrally formed by the laminate M1. The first and second terminal regions 40, 50 can have necessary stiffness as a terminal as before by including the integrated regions R1. The flexible region 60 is lower in stiffness than the integrated regions R1 by including the non-integrated region R2 and can be deflected according to a movement of the first terminal region 40. In this way, three members including the conventional electrical contact member, external connecting member and braided wire can be realized by one member called the laminate M1, wherefore the cost of the connector 80 can be reduced.

Here, the laminate M1 is a member formed by laminating the plurality of thin plates SH1, SH2 and SH3. Since each of the plurality of thin plates SH1, SH2 and SH3 is a substantially similar member (e.g. different only in length), the cost of the connector 80 can be reduced as compared to the case where three totally different members are joined as before.

Further, the flexible region 60 is formed not by a braided wire, but by the plurality of thin plates SH1, SH2 and SH3. Since the thin plates SH1, SH2 and SH3 are thin in the front-rear direction, but have a certain width in the lateral direction, they are higher in strength than thin conductive wires included in the braided wire and thin in both the front-rear direction and lateral direction. Thus, even if the flexible region 60 rubs against another member (e.g. housing 70) included in the connector 80, the breaking of the flexible region 60 can be suppressed. In the above way, according to this embodiment, the cost of the connector 80 can be reduced while the breaking of the flexible region 60 is suppressed.

In this embodiment, the integrated region R1 incudes the joined region R3 where the plurality of thin plates SH1, SH2 and SH3 are resistance-welded or crimped in the thickness direction. Conventionally, in the case of joining a braided wire to a metal plate, it has been necessary to form a plate-like crimping terminal or the like on an end of the braided wire, which has increased cost. In contrast, since the joined regions R3 are formed by directly resistance-welding or crimping the plurality of thin plates SH1, SH2 and SH3 in the thickness direction in this embodiment, it is not necessary to form a separate crimping terminal or the like on end parts of the thin plates SH1, SH2 and SH3. Therefore, cost can be further reduced.

In this embodiment, the first terminal region 40 includes the first part 41 facing the ceiling wall 21 in the vertical direction below the resilient member 30 and provided to be able to contact the mating connector 90 and the second part 42 extending upward from an end part of the first part 41 in the front-rear direction intersecting the vertical direction, and the first and second parts 41, 42 are the integrated region R1.

The first and second parts 41, 42 constitute a part substantially L-shaped at an end part of the laminate M1 and to be attached to the pair of side walls 22, 22. Thus, by forming the first and second parts 41, 42 as the integrated region R1, the loosening of the plurality of thin plates SH1, SH2 and SH3 in the first and second parts 41, 42 can be prevented and the shapes of the first and second parts 41, 42 can be suitably maintained. In this way, the first and second parts 41, 42 are easily attached to the pair of side walls 22, 22 and cost in manufacturing the connector 80 can be reduced.

If the first part 41 is deflected due to the contact of the mating connector 90, a gap may be formed between the first part 41 and the mating connector 90 and the electrical contact of the first part 41 and the mating connector 90 may be hindered. Further, if the first part 41 is deflected due to the contact of the mating connector 90, the first part 41 may be broken. In this embodiment, by forming the first part 41 as the integrated region R1, the stiffness of the first part 41 can be improved and the deflection of the first part 41 can be suppressed. In this way, the first part 41 and the mating connector 90 can be more satisfactorily brought into electrical contact and the durability of the first part 41 can be improved.

In this embodiment, the first terminal region 40 includes the first and the second engaging portions 43, 45 configured to come into contact with the pair of side walls 22, 22 in the unfit state, and the first and second engaging portions 43, 45 are the integrated region R1. The first and second engaging portions 43, 45 maintain the first terminal region 40 at a predetermined position in the unfit state by coming into contact with the pair of side walls 22, 22. By forming the first and second engaging portions 43, 45 as the integrated region R1, the stiffness of the first and second engaging portions 43, 45 is enhanced. Thus, the first terminal region 40 can be more reliably maintained at the predetermined position in the unfit state.

In this embodiment, the first terminal region 40 includes the guided portions 44 to be guided by the guide surfaces 22B1 provided on the pair of side walls 22, 22 so that the first terminal region 40 also moves in the front-rear direction when moving upward, and the guided portions 44 are the integrated region R1. By this configuration, the stiffness of the guided portions 44 is enhanced and the guided portions 44 can be more stably guided by the guide surfaces 22B1.

In this embodiment, the housing 70 includes the accommodating portions 71D, 73B for accommodating the flexible region 60 in the fit state. The accommodating portion 71D is located in front of the flexible region 60 in the unfit state and accommodates the flexible region 60 deflected forward. The accommodating portion 73B is located behind the flexible region 60 in the unfit state and accommodates the flexible region 60 deflected rearward. By accommodating the deflected flexible region 60 by the accommodating portion 71D, 73B, the contact of the flexible region 60 and the housing 70 can be suppressed and the wear of the flexible region 60 can be suppressed. In this way, the breaking of the flexible region 60 can be more suppressed.

In this embodiment, the flexible region 60 includes the bent portion 61 convex rearward in the unfit state. The bent portion 61 is deflected rearward when the first terminal region 40 moves upward, and the accommodating portion 73B is located behind the flexible region 60 and accommodates the bent portion 61 in the fit state. By providing the bent portion 61, a deflection direction of the flexible region 60 can be restricted to a rearward direction. That is, it is possible to enhance the predictability of the deflection direction of the flexible region 60. By providing the accommodating portion 73B behind the bent portion 61 and accommodating the bent portion 61 into the accommodating portion 73B, the contact of the flexible region 60 and the housing 70 can be more reliably suppressed.

In this embodiment, the bent portion 61 is the non-integrated region R2. By this configuration, the bent portion 61 is lower in stiffness than the integrated regions R1 and can be deflected according to a movement of the first terminal region 40.

In this embodiment, the housing 70 includes the edge portion 73C forming the opening Ap2 for opening the internal space of the housing 70 upward, the laminate M1 is inserted into the opening Ap2 in the vertical direction, the second terminal region 50 includes the recessed portions 53 recessed in the lateral direction and fixed to the edge portion 73C with the edge portion 73C accommodated in the recessed portions 53, and the recessed portions 53 are the integrated region R1. By forming the recessed portions 53 as the integrated region R1, the stiffness of the recessed portions 53 is enhanced, wherefore the second terminal region 50 can be more stably fixed to the housing 70.

In this embodiment, the second terminal region 50 includes the upper part 51 forming the bolt hole 51*a*, through which the bolt B1 for fastening the device and the laminate M1 is inserted, above the recessed portions 53, and a region of the second terminal region 50 from the recessed portions 53 to the upper part 51 is the integrated region R1. By this configuration, a region of the second terminal region 50 projecting further upward than the opening Ap2 is formed as the integrated region R1 and high in stiffness, wherefore an operation of fastening the device and the laminate M1 by the bolt B1 is easily performed.

Modifications

Modifications of this embodiment are described below. In the modifications, parts unchanged from the embodiment are denoted by the same reference signs and not described.

<<Modification of Laminate>>

In the laminate M1 of the above embodiment, the plurality of thin plates SH1, SH2 and SH3 are directly exposed. However, for example, in the flexible region 60, the plurality of thin plates SH1, SH2 and SH3 may be covered by an insulting tube. By this configuration, the breaking of the flexible region 60 can be more reliably suppressed.

<<Modification of Accommodating Portions>>

The housing 70 of the above embodiment is provided with the both accommodating portions 71D, 73B. However, one of the accommodating portions 71D, 73B may be omitted or both of the accommodating portions 71D, 73B may be omitted.

<<Modification of Bent Portion>>

The flexible region 60 of the above embodiment includes the bent portion 61 convex rearward in the unfit state and to be deflected rearward when the first terminal region 40 moves upward. However, the flexible region 60 may not be provided with the bent portion 61. Further, the flexible region 60 of the above embodiment may include a bent portion 61*a* convex forward in the unfit state and to be deflected forward when the first terminal region 40 moves upward. In this case, the housing 70 is preferably provided with the accommodating portion 71D for accommodating the bent portion 61*a* deflected forward.

MISCELLANEOUS

In the above embodiment, an example is described where the first terminal region 40 moves obliquely to an upper rear side when the mating connector 90 is fit. However, a rearward movement of the first terminal region 40 is not essential at the time of fitting and the first terminal region 40 may move only upward. In this case, the guide surface 22B1 of the first leg portion 22B is shaped to extend straight downward, and the guided portion 44 is guided only in the vertical direction.

ADDENDUM

Note that at least some of the above embodiment and various modifications may be arbitrarily combined with each other. Further, the embodiment disclosed this time should be considered illustrative in all aspects, rather than restrictive. The scope of the present disclosure is represented by claims and intended to include all changes in the scope of claims and in the meaning and scope of equivalents.

LIST OF REFERENCE NUMERALS

10 terminal module
20 case
21 ceiling wall
22 side wall
22A base portion
22B first leg portion
22B1 guide surface
22C second leg portion
23 side wall
24 first receiving portion
25 lower end portion
26 second receiving portion
27 protrusion
30 resilient member
31 body portion
32 upper end portion
33 lower end portion
40 first terminal region

41 first part
41A upper surface
41B lower surface
42 second part
42A front surface
42B rear surface
43 first engaging portion
44 guided portion
45 second engaging portion
50 second terminal region
51 upper part
51*a* bolt hole
52 lower part
53 recessed portion
60 flexible region
61 bent portion
61*a* bent portion
70 housing
71 upper divided body
71A upper wall
71B front wall
71C rear wall
71D accommodating portion
72 lower divided body
72A tube portion
72B front wall
72C partition wall
72D rear wall
73 cover
73A body portion
73B accommodating portion
73C edge portion
80 connector
90 mating connector
91 mating terminal
92 mating housing
93 mating contact point
94 fitting portion
95 flange portion
M1 laminate
SH1 thin plate
SH2 thin plate
SH3 thin plate
R1 integrated region
R2 non-integrated region
R3 joined region
B1 bolt
Ap1 opening
Ap2 opening
AR1 arrow

What is claimed is:

1. A terminal module to be electrically connected to a mating connector by being fit to the mating connector relatively approaching along a first direction from one side toward another side, comprising:

a case including a ceiling wall and a pair of side walls extending toward the one side from the ceiling wall;

a resilient member to be accommodated into the case, the resilient member being stretchable along the first direction; and an electrically conductive laminate formed by laminating a plurality of thin plates, the laminate including:

a first terminal region supported on the pair of side walls while being biased toward the one side by the resilient member, the first terminal region being movable toward the other side by being pressed by the mating connector;

a second terminal region located away from the first terminal region toward the other side; and a flexible region located between the first and second terminal regions, the flexible region being deflected when the first terminal region moves toward the other side, each of the first and second terminal regions including an integrated region where the plurality of thin plates are integrated in a thickness direction, and the flexible region including a non-integrated region where the plurality of thin plates are not integrated in the thickness direction.

2. The terminal module of claim 1, wherein:

the plurality of thin plates are thin plates made of metal, and the integrated region includes a joined region where the plurality of thin plates are resistance-welded or crimped in the thickness direction.

3. The terminal module of claim 1, wherein:

the first terminal region includes:

a first part facing the ceiling wall in the first direction on the one side of the resilient member, the first part being provided to be able to contact the mating connector; and a second part extending toward the other side from an end part of the first part in a second direction intersecting the first direction, and the first and second parts are the integrated region.

4. The terminal module of claim 1, wherein:

the first terminal region includes an engaging portion configured to come into contact with the pair of side walls before fitting to the mating connector, and the engaging portion is the integrated region.

5. The terminal module of claim 1, wherein:

the first terminal region includes a guided portion to be guided by guide surfaces provided on the pair of side walls so that the first terminal region moves also in a second direction intersecting the first direction when moving toward the other side, and the guided portion is the integrated region.

6. The terminal module of claim 1, wherein:

the flexible region includes a bent portion convex toward a predetermined side in a second direction intersecting the first direction before fitting to the mating connector, and the bent portion is deflected toward the predetermined side when the first terminal region moves toward the other side.

7. A connector, comprising:

the terminal module of claim 1; and a housing for accommodating the terminal module.

8. The connector of claim 7, wherein the housing includes an accommodating portion for accommodating the flexible region at the time of fitting to the mating connector.

9. The connector of claim 8, wherein:

the flexible region includes a bent portion convex toward a predetermined side in a second direction intersecting the first direction before fitting to the mating connector, the bent portion is deflected toward the predetermined side when the first terminal region moves toward the other side, and the accommodating portion is located on the predetermined side of the flexible region and accommodates the bent portion at the time of fitting to the mating connector.

10. The connector of claim 7, wherein:

the housing includes an edge portion forming an opening for opening an internal space of the housing to the other side, the laminate is inserted into the opening in the first direction, the second terminal region includes a recessed portion recessed in a third direction intersecting both the thickness direction and the first direction and is fixed to the edge portion with the edge portion accommodated in the recessed portion, and the recessed portion is the integrated region.

11. The connector of claim 10, wherein:

the second terminal region includes a bolt fastening portion forming a bolt hole on a side closer to the other side than the recessed portion, a bolt for fastening a device and the laminate being inserted into the bolt hole, and a region of the second terminal region from the recessed portion to the bolt fastening portion is the integrated region.

* * * * *